United States Patent
Maede et al.

(10) Patent No.: US 11,785,341 B2
(45) Date of Patent: Oct. 10, 2023

(54) CROSSTALK CORRECTION METHOD AND ACTUATOR DRIVER

(71) Applicant: ROHM CO., LTD., Kyoto (JP)

(72) Inventors: Jun Maede, Kyoto (JP); Takuto Tsukamoto, Kyoto (JP); Tetsuya Yoshida, Kyoto (JP); Yoshihiro Sekimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 4 days.

(21) Appl. No.: 17/712,665

(22) Filed: Apr. 4, 2022

(65) Prior Publication Data
US 2022/0224839 A1  Jul. 14, 2022

Related U.S. Application Data

(63) Continuation of application No. PCT/JP2020/036086, filed on Sep. 24, 2020.

(30) Foreign Application Priority Data

Oct. 4, 2019  (JP) .............................. 2019-183508

(51) Int. Cl.
 *H04N 23/68* (2023.01)

(52) U.S. Cl.
 CPC ......... *H04N 23/687* (2023.01); *H04N 23/683* (2023.01)

(58) Field of Classification Search
 CPC ............... H04N 23/687; H04N 23/683; H04N 23/6812; H04N 23/00; G02B 7/04; G03B 5/00
 See application file for complete search history.

(56) References Cited

U.S. PATENT DOCUMENTS

2016/0327806 A1* 11/2016 Kasamatsu .......... G02B 27/646
2018/0100985 A1*  4/2018 Maede .................. G01D 3/036
(Continued)

FOREIGN PATENT DOCUMENTS

JP  2007114121 A  5/2007
JP  2019120747 A  7/2019

OTHER PUBLICATIONS

International Search Report corresponding to Application No. PCT/JP2020/036086, dated Dec. 1, 2020.
(Continued)

*Primary Examiner* — Padma Haliyur
(74) *Attorney, Agent, or Firm* — CANTOR COLBURN LLP

(57) ABSTRACT

An image stabilization actuator is used to displace a movable unit in a first direction, and a position in the first direction when an AF-axis position detection signal reaches a peak value is detected. Similarly, the image stabilization actuator is used to displace the movable unit in a second direction, and a position in the second direction when the AF-axis position detection signal reaches a peak value is detected. A reference position based on the position in the first direction and the position in the second direction thus obtained is stored. Correction information indicating a relationship between a displacement amount, from the reference position, of the movable unit displaced by the image stabilization actuator and a correction amount of the position detection signal is stored.

6 Claims, 11 Drawing Sheets

(56) References Cited

U.S. PATENT DOCUMENTS

2018/0249082 A1\* 8/2018 Saito .................... H04N 23/687
2020/0174219 A1\* 6/2020 Sugawara .............. H04N 23/67

OTHER PUBLICATIONS

PCT International Preliminary Report on Patentability with Written Opinion of the International Searching Authority for corresponding Application PCT/JP2020/036086; dated Apr. 5, 2022.

\* cited by examiner

CROSSTALK CORRECTION METHOD AND ACTUATOR DRIVER

CROSS REFERENCE TO RELATED APPLICATIONS

This application is a continuation under 35 U.S.C. § 120 of PCT/JP2020/036086, filed Sep. 24, 2020, which is incorporated herein by reference, and which claimed priority to Japanese Application No. 2019-183508, filed Oct. 4, 2019. The present application likewise claims priority under 35 U.S.C. § 119 to Japanese Application No. 2019-183508, filed Oct. 4, 2019, the entire content of which is also incorporated herein by reference.

BACKGROUND

1. Technical Field

The present disclosure relates to a crosstalk correction method for position detection by a camera module, and an actuator driver having a crosstalk correction function.

2. Description of the Related Art

The number of camera modules that are mounted on smartphones or the like and have a function of controlling a position of an imaging lens or an image sensor with high accuracy and high speed by detecting a relative position (displacement amount) between the imaging lens and the image sensor and feeding back the position information has been on the increase recently. For example, the application of feedback control as optical image stabilization (OIS) enables high-accuracy image stabilization. Further, the application of feedback control to an autofocus (AF) function enables high-speed focus pull-in and enables a focus position to be maintained with higher accuracy.

Various examples have been disclosed as camera modules in which feedback control is applied to both the OIS function and the AF function. For example, Japanese Patent Application (Laid Open) No. 2019-120747 discloses an example where an imaging lens is driven for AF, and the whole of an AF actuator is driven for OIS. Here, a detection magnet for detecting an AF position is disposed on an AF movable unit, and a Hall element for detecting a change in magnetic field is disposed on a fixed unit.

In the camera module described in Japanese Patent Application (Laid Open) No. 2019-120747, since the detection magnet for detecting the AF position is disposed on the AF movable unit and, the Hall element is disposed on the fixed unit, when the movable unit is displaced due to OIS, the AF detection magnet is also displaced, so that so-called crosstalk occurs in which an AF position detection signal changes due to the OIS displacement. A countermeasure against this crosstalk has been proposed where the AF position detection magnet has a cylindrical shape, displacements in the X direction and the Y direction from a reference position when image stabilization has yet to be performed are converted into a radius, and crosstalk correction is performed so as to cancel out an error in the AF position detection signal in accordance with the radius.

However, the error in the AF position detection signal can be formulated in accordance with the radius only when the center of the position detection magnet is located right above a magnetosensitive unit of the Hall element at the reference position. For an actual camera module, however, there is no guarantee that the center of the position detection magnet is located right above the magnetosensitive unit of the Hall element due to the influence of dimensional tolerance of each component, assembly variations, or the like.

When the magnet center and the magnetosensitive unit of the Hall element are misaligned, magnetic flux density being detected does not depend on the radius but has directionality, and it is therefore necessary to perform correction in accordance with a two-dimensional distribution in the XY plane, which makes crosstalk correction extremely complicated.

SUMMARY

The present disclosure has been made in view of such circumstances, and it is therefore an exemplary general purpose of one embodiment of the present disclosure to provide a crosstalk correction method by which the influence of assembly variations or the like is reduced, and an actuator driver having such a crosstalk correction function.

A correction method according to one embodiment of the present disclosure relates to a correction method applied to a camera module. The camera module includes a movable unit including an imaging lens and a magnet, an autofocus actuator structured to position the movable unit in a Z-axis direction along an optical axis, an autofocus position detector including a magnetic field detection element structured to detect magnetic field generated by the magnet, the autofocus position detector being structured to generate a position detection signal indicating a position of the movable unit in the Z-axis direction, and an image stabilization actuator structured to position the movable unit in an X-axis direction and a Y-axis direction orthogonal to each other in a plane orthogonal to an optical axis direction of the imaging lens. The correction method includes displacing the movable unit in a first direction using the image stabilization actuator and detecting a position in the first direction when the position detection signal reaches a peak value, displacing the movable unit in a second direction using the image stabilization actuator and detecting a position in the second direction when the position detection signal reaches a peak value, storing a reference position based on the position in the first direction and the position in the second direction, storing correction information indicating a relationship between a displacement amount, from the reference position, of the movable unit displaced by the image stabilization actuator and a correction amount of the position detection signal, acquiring, during image stabilization and autofocus operation, the displacement amount of the movable unit from the reference position and generating the correction amount corresponding to the displacement amount on the basis of the correction information, and correcting the position detection signal using the correction amount.

Another embodiment of the present disclosure relates to an actuator driver used in a camera module. The camera module includes a movable unit including an imaging lens and a magnet, an autofocus actuator structured to position the movable unit in a Z-axis direction along an optical axis, an autofocus position detector including a magnetic field detection element structured to detect magnetic field generated by the magnet, the autofocus position detector being structured to generate a position detection signal indicating a position of the movable unit in the Z-axis direction, and an image stabilization actuator structured to position the movable unit in an X-axis direction and a Y-axis direction orthogonal to each other in a plane orthogonal to an optical axis direction of the imaging lens. The actuator driver includes an autofocus drive unit structured to control the autofocus actuator, an image stabilization drive unit structured to control the image stabilization actuator, a first memory storing a reference position, a second memory storing correction information, and a processor. In a calibration process, the movable unit is displaced in a first direction, and a position in the first direction when the position detection signal reaches a peak value is detected, in the calibration process, the movable unit is displaced in a second direction, and a position in the second direction when the position detection signal reaches a peak value is detected, in the calibration process, a reference position based on the position in the first direction and the position in the second direction is stored in the first memory, and in the calibration process, correction information indicating a relationship between a displacement amount, from the reference position, of the movable unit displaced by the image stabilization actuator and a correction amount of the position detection signal is stored in the second memory. The processor generates, during image stabilization and autofocus operation, the correction amount corresponding to the displacement amount of the movable unit from the reference position is acquired, and corrects the position detection signal using the correction amount on the basis of the correction information.

One embodiment of the present disclosure relates to a crosstalk correction method. The crosstalk correction method for a position detection signal in a camera module having an autofocus function and an image stabilization function implemented by displacing an imaging lens and including a position detector of a movable unit provided for autofocus and a position detector of the movable unit provided for image stabilization, the position detector provided for autofocus including a position detection magnet disposed on the movable unit and a magnetic field detection element disposed on a fixed unit, includes a process of displacing each of the movable units in two-axis directions orthogonal to an optical axis of an imaging lens, a process of detecting a peak of the position detection signal for autofocus due to displacement, a process of storing a position detection signal value used for image stabilization when the peak is detected in each of the two-axis directions, and a process of setting and storing in advance, with a position indicating the stored position detection signal value as a reference position, a relationship between a displacement amount from the reference position and a change in the position detection signal for autofocus. The displacement amount from the reference position during image stabilization operation is detected, a change in the position detection signal for autofocus is calculated from the displacement amount on the basis of the stored relationship, and then crosstalk correction is performed by subtracting the change from the position detection signal for autofocus.

According to this embodiment, even when the center of the position detection magnet and the position of the magnetosensitive unit of the Hall element are misaligned in the initial state, a condition that the magnetosensitive unit of the Hall element is located on the extension line of the center of the position detection magnet is searched for, with the condition set as the reference position, the displacement amount from the reference position during OIS operation is converted into a radius, and an error in the position detection signal in accordance with the radius can be corrected, so that the crosstalk correction can be easily performed.

Further, when displacement amounts from the reference position are denoted by $\Delta X$, $\Delta Y$, the displacement amounts are converted into a radius by $R=\sqrt{(\Delta X^2+\Delta Y^2)}$, and the position detection signal for autofocus may be corrected in accordance with the value of R.

Further, when displacement amounts from the reference position in the first direction and the second direction are denoted by $\Delta X$, $\Delta Y$, respectively, and $A_U$, $A_V$ each denote a constant, the correction information may indicate a relationship between a radius R of $R=\sqrt{(A_U\Delta X^2+A_V\Delta Y^2)}$ and the correction amount. As a result, when different crosstalk occurs in the X direction and the Y direction, the correction can be correctly performed.

This allows the relationship between the displacement and the correction amount of the position detection signal to be converted from a two-dimensional form to a one-dimensional form, so that calculation of a correction factor used for the crosstalk correction or correction operation can be easily performed.

Further, in a process of displacing the movable unit in two-axis directions orthogonal to the optical axis of the imaging lens, feedback control for autofocus need not be performed.

Accordingly, the feedback control for autofocus is not performed, so that the position of the movable unit in the optical axis direction is basically constant, and a change in the AF position detection signal when the movable unit is displaced in a direction orthogonal to the optical axis can be captured.

Further, linear correction on the position detection signal for autofocus may be performed before the process of subtracting the change from the position detection signal for autofocus.

This makes correction after the linearization easier than correction of a difference between different curves.

Another embodiment of the present disclosure relates to an actuator driver. The actuator driver having a function of performing the above-described crosstalk correction includes a memory storing a position detection signal value for image stabilization in which a position detection signal for autofocus reaches a peak when a movable unit is displaced in two-axial directions orthogonal to an optical axis of an imaging lens, a memory storing a relationship between a displacement amount from a reference position and a change in the position detection signal for autofocus, and a processor structured to perform processing of calculating a change in the position detection signal for autofocus in accordance with the displacement amount from the reference position during image stabilization operation and subtracting the change from the position detection signal for autofocus.

According to this embodiment, the actuator driver includes the memories and the processor used for performing the crosstalk correction, even when the center of the position detection magnet and the position of the magnetosensitive unit of the Hall element are misaligned in the initial state, a condition that the magnetosensitive unit of the Hall element is located on the extension line of the center of the position detection magnet is searched for, with the condition set as the reference position, the displacement amount from the reference position during OIS operation is converted into a radius, and an error in the position detection signal in accordance with the radius can be corrected, so that it is possible to provide the actuator driver that can easily perform the crosstalk correction.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Herein, "a state where a member A is connected to a member B" includes not only a case where the member A and the member B are physically and directly connected to each other, but also a case where the member A and the member B are indirectly connected to each other via another member that has substantially no effect on an electrical connection state between the member A and the member B or that does not impair a function or an effect exhibited by the connection between the member A and the member B.

Similarly, "a state where a member C is provided between the member A and the member B" includes not only a case where the member A and the member C, or the member B and the member C are directly connected to each other, but also a case where the members are indirectly connected to each other via another member that has substantially no effect on an electrical connection state among the members or that does not impair a function or an effect exhibited by the connection among the members.

Figure 1:
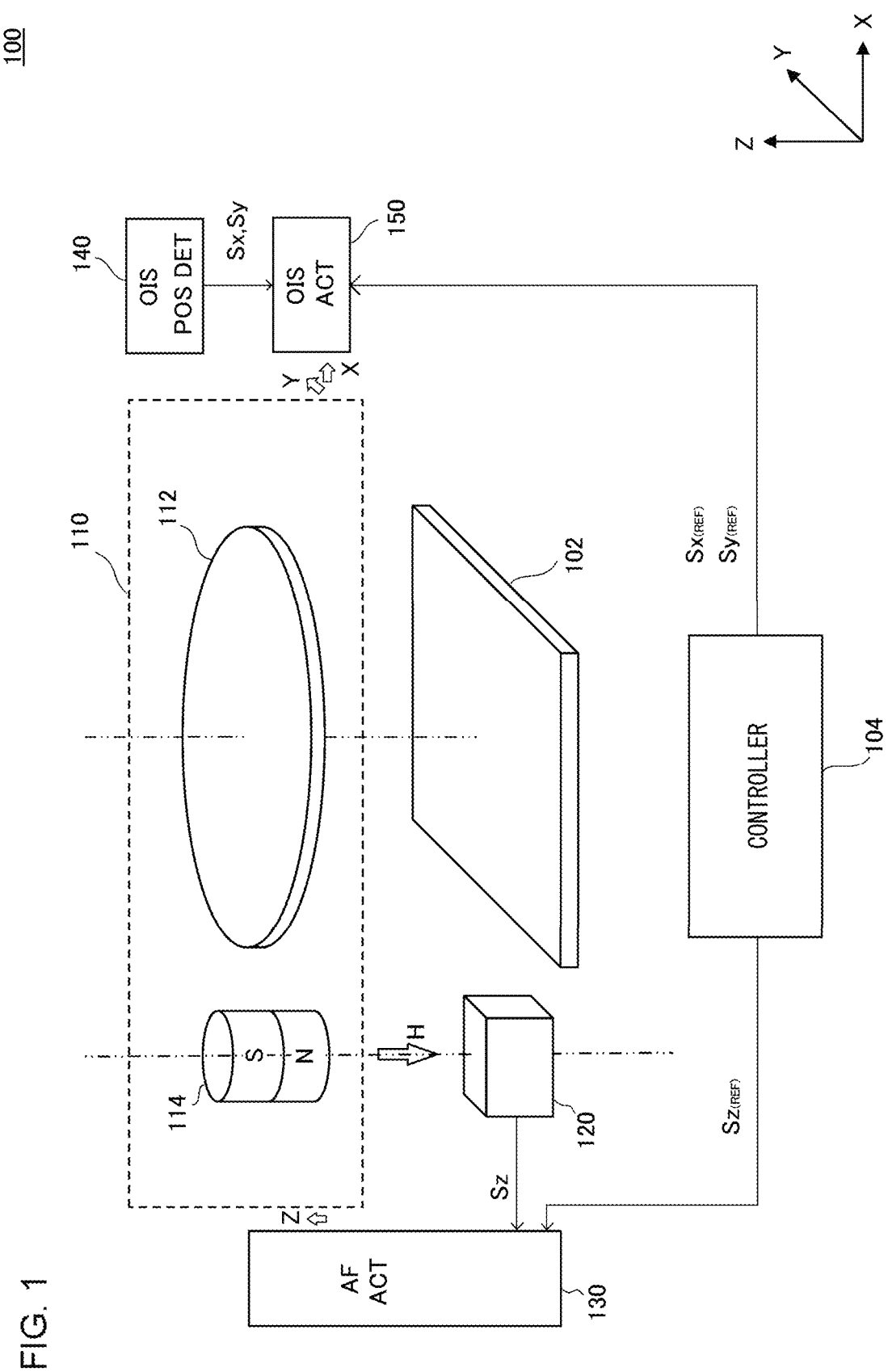
FIG. 1 is a diagram showing a camera module according to an embodiment.

FIG. 1 is a diagram showing a camera module 100 according to an embodiment. The camera module 100 includes an image sensor 102, a controller 104, a movable unit 110, an AF position detector 120, an AF actuator 130, an OIS position detector 140, and an OIS actuator 150.

The image sensor 102 is a complementary metal oxide semiconductor (CMOS) sensor or a charge coupled device (CCD).

The movable unit 110 includes an imaging lens 112 and a magnet 114 for use in position detection. The imaging lens 112 is provided adjacent to a subject relative to the image sensor 102. An optical axis direction of the imaging lens 112 is a Z axis, and an X axis and a Y axis are on a plane orthogonal to the Z axis. A distance between the imaging lens 112 and the image sensor 102 is controlled by displacing the movable unit 110 in the Z-axis direction, thereby allowing an image of the subject to be formed on the image sensor 102 (AF operation). Further, camera shake can be corrected by displacing the movable unit 110 in the X-axis direction and the Y-axis direction (OIS operation).

The magnet 114 is a permanent magnet having a cylindrical shape with a height direction coincident with the optical axis and magnetized in the height direction. The AF position detector 120 includes a magnetic sensor such as a Hall element detects a magnetic field H (or magnetic flux density B) produced by the magnet 114, and generates a position detection signal Sz on the basis of the magnetic field H. The position detection signal Sz varies in a manner that depends on a distance between the magnet 114 and the AF position detector 120, that is, a position of movable unit 110 in the Z-axis direction.

The controller 104 controls the position of the movable unit 110 (imaging lens 112) in the Z direction to attain proper focus. The AF actuator 130 is a voice coil motor including a coil and a permanent magnet. Upon receipt of a position command $Sz_{(REF)}$ from the controller 104, the AF actuator 130 regulates an electric current flowing through the coil so as to make a position z indicated by the position detection signal Sz closer to a target position $z_{REF}$ indicated by the position command $Sz_{(REF)}$ and positions the movable unit 110 in the Z-axis direction by feedback control.

The OIS position detector 140 includes a magnetic sensor such as a Hall element, and generates position detection signals Sx, Sy on the basis of the position of the movable unit 110 in the X-axis direction and the Y-axis direction.

The OIS actuator 150 positions the movable unit 110 in the X-axis direction and the Y-axis direction in a plane orthogonal to the optical axis direction of the imaging lens 112 so as to reduce camera shake. For example, the controller 104 includes a gyroscope that detects rotation about a pitch axis and yaw axis of the camera module 100. A position command $Sx_{(REF)}$ of the X axis and a position command $Sy_{(REF)}$ of the Y axis can be generated from angle information obtained as a result of integrating the output of the gyroscope and converting the resultant into the angle information.

As with the AF actuator 130, the OIS actuator 150 is a voice coil motor including a coil and a permanent magnet. The OIS actuator 150 regulates an electric current flowing through the coil so as to make the current positions x, y of the movable unit 110 indicated by the position detection signals Sx, Sy closer to target positions $x_{REF}$, $y_{REF}$ indicated by the position commands $Sx_{(REF)}$, $Sy_{(REF)}$ and positions the movable unit 110 in the X-axis direction and the Y-axis direction by feedback control.

The basic configuration of the camera module 100 has been described above. In the camera module 100, the position detection signal Sz generated by the AF position detector 120 ideally depends only on the position of the movable unit 110 in the Z direction and should not depend on the positions in the X direction and the Y direction, but in practice, when the movable unit 110 moves in the X-Y plane, the magnetic field H incident on the AF position detector 120 varies. This is referred to as crosstalk.

Next, crosstalk correction will be described. The crosstalk correction includes a calibration process and an actual operation process of correcting position information on the basis of correction information obtained in the calibration process.

Figure 2:
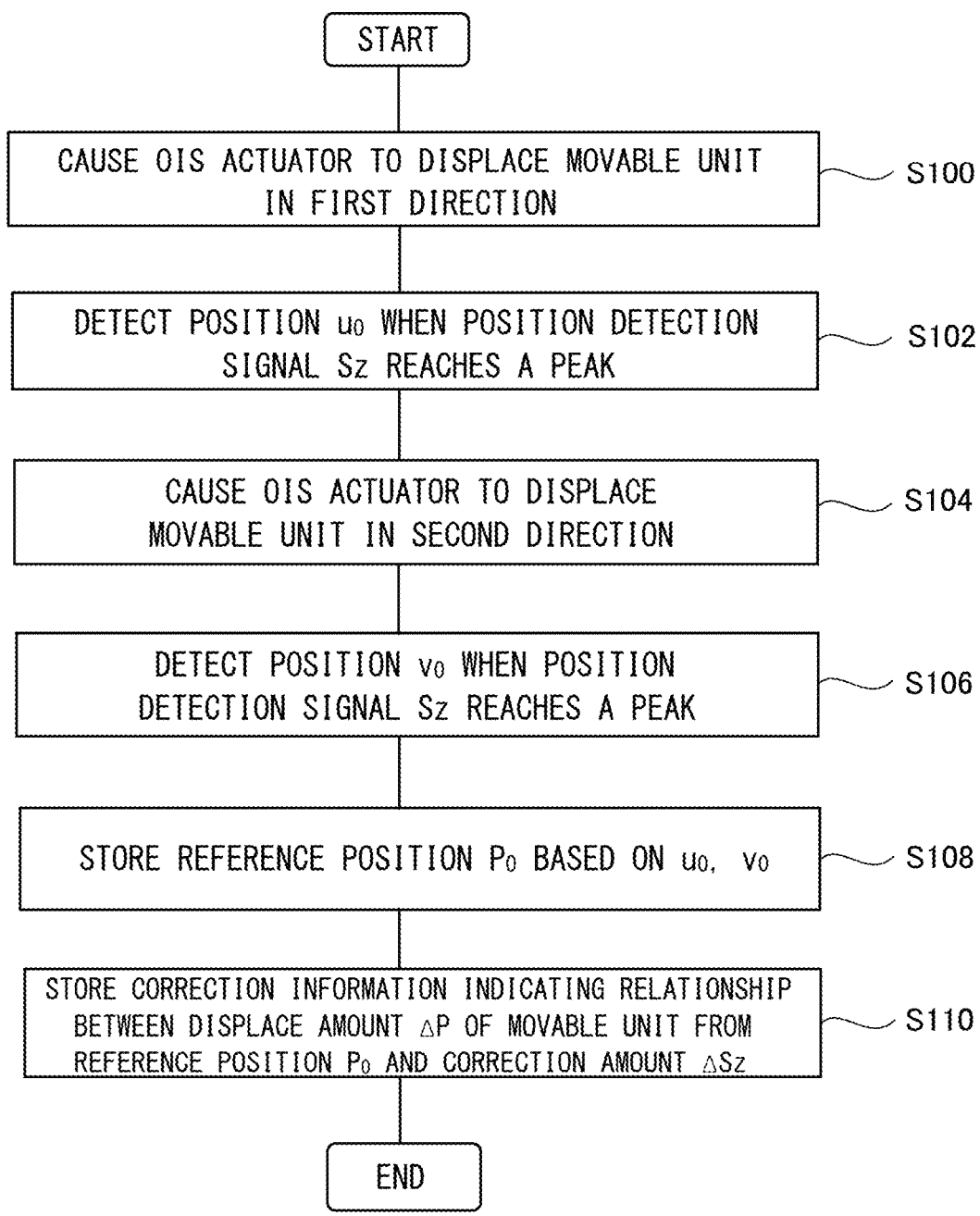
FIG. 2 is a flowchart of a calibration process of crosstalk correction according to the embodiment.

FIG. 2 is a flowchart of the calibration process of the crosstalk correction according to the embodiment. First, the movable unit 110 is displaced in a first direction (U-axis direction) by an image stabilization actuator (S100), and a position $u_0$ in the first direction when the position detection signal Sz reaches a peak value is detected (S102).

Similarly, the movable unit 110 is displaced in a second direction (V-axis direction) by the image stabilization actuator (S104), and a position $v_0$ in the second direction when the position detection signal Sz reaches a peak value is detected (S106). The U axis and the V axis may or may not coincide with the X axis and the Y axis, respectively.

Then, a reference position $P_0$ based on the position $u_0$ in the first direction and the position $v_0$ in the second direction is stored (S108).

The correction information indicating a relationship between a displacement amount ΔP, from the reference position $P_0$, of the movable unit 110 displaced by the OIS actuator 150 and a correction amount ΔSz of the position detection signal Sz is stored (S110). The displacement amount ΔP is a combination of a displacement amount ΔU in the first direction and a displacement amount ΔV in the second direction.

Figure 3:
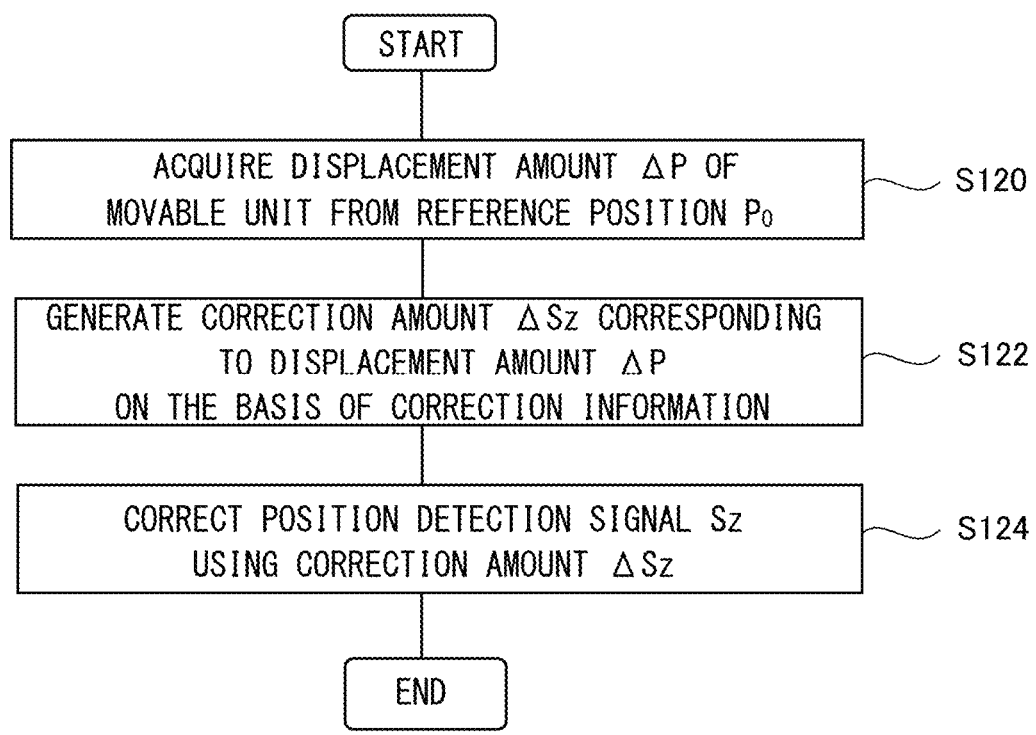
FIG. 3 is a flowchart of an actual operation process of the crosstalk correction according to the embodiment.

FIG. 3 is a flowchart of the actual operation process of the crosstalk correction according to the embodiment. During image stabilization and autofocus operation, the displacement amount ΔP of the movable unit 110 from the reference position $P_0$ is acquired (S120). The correction amount ΔSz corresponding to the displacement amount ΔP is generated on the basis of the correction information (S122). Then, the position detection signal Sz is corrected using the correction amount ΔSz (S124).

The crosstalk correction in the camera module 100 has been described above. The present disclosure is applicable to various apparatuses and methods understood from the block diagram shown in FIG. 1 or the flowcharts shown in FIG. 2 and FIG. 3 or derived from the above description, and is not limited to a specific configuration. Hereinafter, more specific configuration examples and practical examples will be described in order not to narrow down the scope of the present disclosure but to help understanding of the essence and operation of the disclosure and to clarify them.

Figure 4:
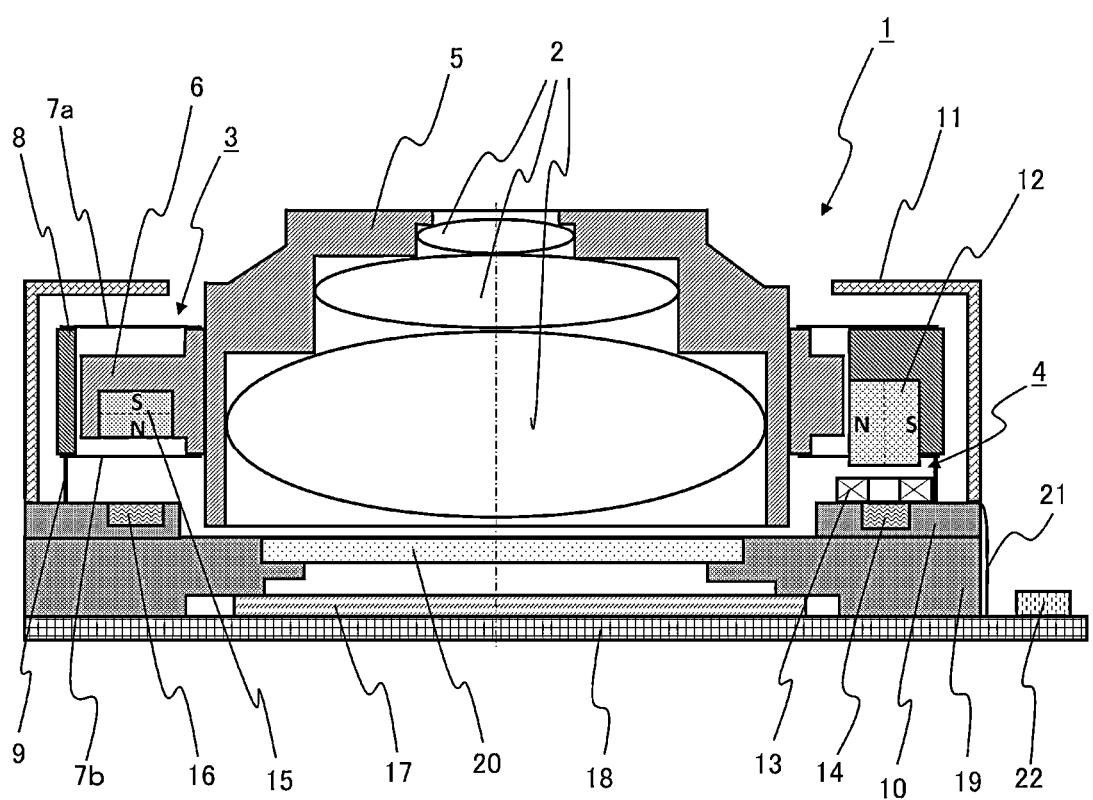
FIG. 4 is a central cross-sectional view schematically showing a structure of the camera module that performs the crosstalk correction according to the embodiment.

FIG. 4 is a central cross-sectional view schematically showing a structure of the camera module that performs the crosstalk correction according to the embodiment.

A camera module 1 is built in a digital camera, a digital video camera, a smartphone, or a tablet terminal, and is used for photographing or video shooting. The camera module 1 has an AF function and an OIS function, for each of which a position detector of a movable unit is provided, and thus allows feedback control. The position detector includes a magnet and a Hall element. Instead of the Hall element, a magnetoresistive element such as an MR element or a GMR element may be used. A position detection magnet for OIS also serves as a driving magnet, but for AF, a position detection magnet is provided separately from a driving magnet.

As shown in FIG. 4, the camera module 1 includes an AF actuator 3 structured to position an imaging lens 2 in the optical axis direction, and an OIS actuator 4 structured to position the whole of the AF actuator in a plane orthogonal to the optical axis.

The imaging lens 2 is housed in a lens barrel 5. Although three imaging lenses 2 are shown in FIG. 4, four or more imaging lenses 2 may be provided, or two or less imaging lenses 2 may be provided. The lens barrel 5 is mounted with the lens barrel 5 positioned in a lens holder 6. The lens holder 6 is supported by upper and lower two AF springs 7a, 7b so as to be movable in the optical axis direction relative to a magnet holder 8. The magnet holder 8 is supported by four suspension wires 9 so as to be movable in a direction orthogonal to the optical axis (the X-axis direction and the Y-axis direction in FIG. 4) relative to a base 10 that is a fixed unit. A cover 11 is provided on base 10 so as to cover the whole of the AF actuator 3 and OIS actuator 4.

An OIS driving magnet 12 is mounted on the magnet holder 8, and an OIS coil 13 is fixed on the base 10 so as to face the OIS driving magnet 12. Similarly, an OIS Hall element 14 is fixed to the base 10 so as to face the OIS driving magnet 12. That is, the OIS driving magnet 12 is also responsible for OIS position detection. The OIS driving magnet 12, the OIS coil 13, and the OIS Hall element 14 thus shown are provided for the Y axis of FIG. 4, and an OIS driving magnet, an OIS coil, and an OIS Hall element for the X axis (not shown) are provided on a side rotated by 90 degrees. On the other hand, an AF position detector is provided on a side opposite from the OIS driving magnet 12 and the like thus shown. Specifically, an AF position detection magnet 15 is mounted on the lens holder 6, and an AF Hall element 16 is fixed to the base 10 so as to face the AF position detection magnet 15. The AF position detection magnet 15 thus shown is used only for position detection and is not used for driving. The AF driving magnet and the coil, that is, the AF actuator 3, are provided on a side rotated by 90 degrees (not shown). The AF driving magnet may also serve as an OIS X-axis driving magnet. The OIS Hall element 14 detects displacement of the magnet holder 8 in a direction orthogonal to the optical axis (the Y-axis direction in FIG. 4), and the AF Hall element 16 detects displacement of the lens holder 6 in the optical axis direction (the Z-axis direction in FIG. 4).

As described above, the AF position detection magnet is mounted on the AF movable unit, and the AF Hall element is mounted on the base that is a fixed unit. The AF movable unit is movable in the optical axis direction for the AF operation and is also displaced in the directions orthogonal to the optical axis during the OIS operation. Therefore, the AF position detection signal is affected by the OIS operation, and so-called crosstalk occurs accordingly. When crosstalk occurs, a false position detection signal is generated, so that it is desirable to remove the influence of crosstalk as much as possible.

An image sensor 17 is mounted on a module board 18 and covered by a sensor cover 19. The base 10 is mounted on the sensor cover 19. The sensor cover 19 has an opening in its center, and the opening is covered with an IR cut glass 20. A flexible printed circuit (FPC) 21 is provided as a conduction path of the coils and Hall elements belonging to the AF actuator 3 and the OIS actuator 4, and is connected to the module board 18. An actuator driver 22 is mounted on the module board 18, the actuator driver 22 being structured to process the position detection signals of the AF actuator 3 and the OIS actuator 4, correct crosstalk, and supply an appropriate drive electric current to the coils.

Figure 5:
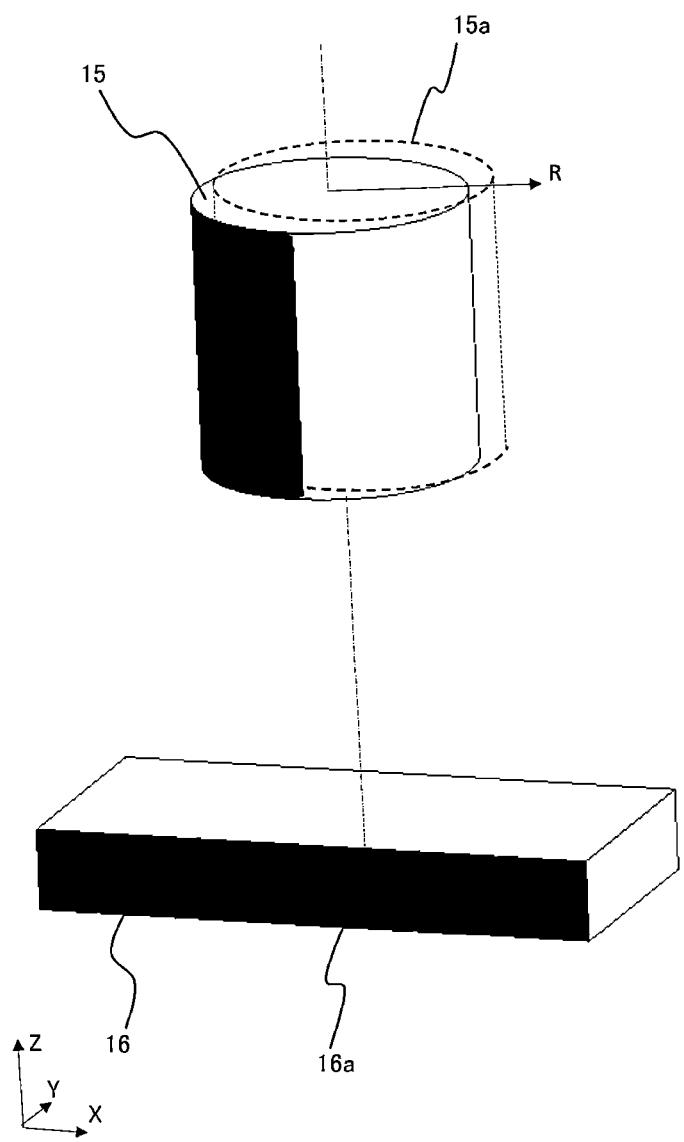
FIG. 5 is a perspective view showing a relationship between an AF position detection magnet and a Hall element of the camera module shown in FIG. 4.
Figure 6:
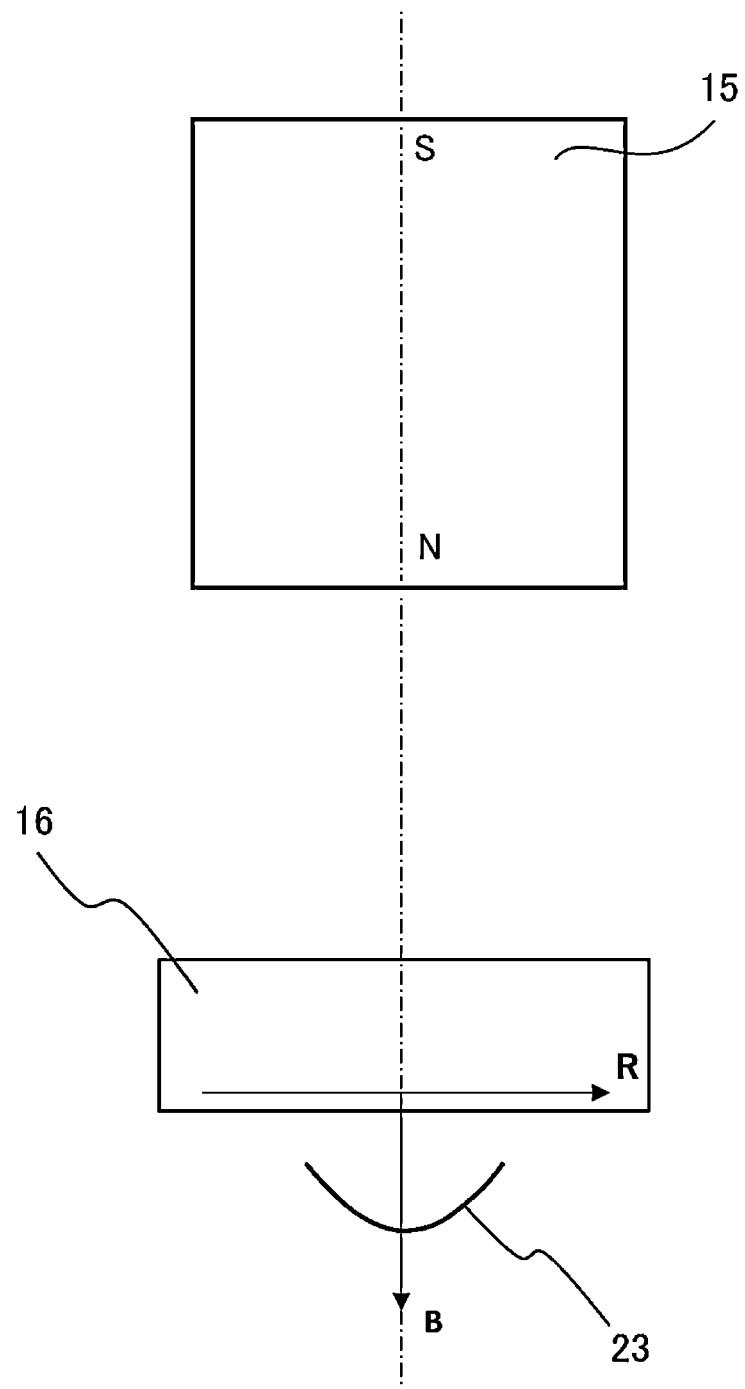
FIG. 6 is a side view showing an example of a positional relationship between the AF position detection magnet and the Hall element of the camera module shown in FIG. 4 and a magnetic flux density distribution at a Hall element position.

Next, a relationship between the AF position detection magnet 15 and the AF Hall element 16 will be described in detail with reference to FIG. 5 and FIG. 6. FIG. 5 is a perspective view showing a relationship between the AF position detection magnet 15 and the Hall element 16 of the camera module shown in FIG. 4. FIG. 6 is a side view showing an example of a positional relationship between the AF position detection magnet 15 and the Hall element 16 and a magnetic flux density distribution at the Hall element position in the camera module shown in FIG. 4.

As shown in FIG. 5, the AF position detection magnet 15 has a cylindrical shape. Assuming that a magnetosensitive unit 16a of the AF Hall element 16 is located on the extension line of the center axis of the cylinder, this positional relationship is set as the reference position $P_0$, the displacement $\Delta P$ (AF position detection magnet 15 moves in the X-axis and Y-axis directions) from the reference position $P_0$ is converted into a radius R, and a graph 23 of a relationship between the radius R and the magnetic flux density B can be derived as shown in FIG. 6. Here, the AF position detection magnet 15 is set such that its N pole faces downward, so that a coordinate axis of the magnetic flux density B is set downward. The graph 23 shows a relationship between a displacement amount R and the magnetic flux density B when the AF position detection magnet 15 is displaced in a direction orthogonal to the optical axis relative to the AF Hall element 16. The graph 23 has a rotationally symmetric shape with respect to an origin of R=0 (that is, the reference position), so that the magnetic flux density decreases as R increases. Such a magnetic flux density distribution generated by the AF position detection magnet 15 makes the magnetic flux density highest on the center axis. The graph 23 showing this relationship looks like a quadratic function, so that B may be functionally approximated as a quadratic function of R.

With a cylindrical magnet 15a having a center axis off-center as indicated by the broken line in FIG. 5 in the initial state (for example, when image stabilization by OIS has yet to be performed, and no current is applied), and this state set as the reference position, even when the displacement from the reference position is converted into a radius, a change in the magnetic flux density cannot be uniquely expressed by the radius R, and very complicated crosstalk correction is required. Therefore, before the crosstalk correction, it is necessary to first find a position where the center axis of the cylindrical magnet is on the magnetosensitive unit of the Hall element, set this position as the reference position, convert the displacement amount from the reference position into a radius, and obtain a relationship between the radius R and the magnetic flux density in the magnetosensitive unit of the Hall element.

Note that the shape of the magnet 15a is not limited to a cylindrical shape as long as the magnet 15a can generate a rotationally symmetric magnetic flux density distribution. For example, even with a rectangular parallelepiped magnet, the magnetic flux density distribution in a region away from the rectangular parallelepiped magnet can be regarded as being substantially rotationally symmetric. Alternatively, a non-cylindrical magnet may be used, and the magnetic flux density distribution may be made rotationally symmetric around the non-cylindrical magnet. For example, a cylindrical magnetic body (back yoke) may be connected to a rectangular parallelepiped magnet, and the magnetic flux density distribution may be made rotationally symmetric.

Figure 7:
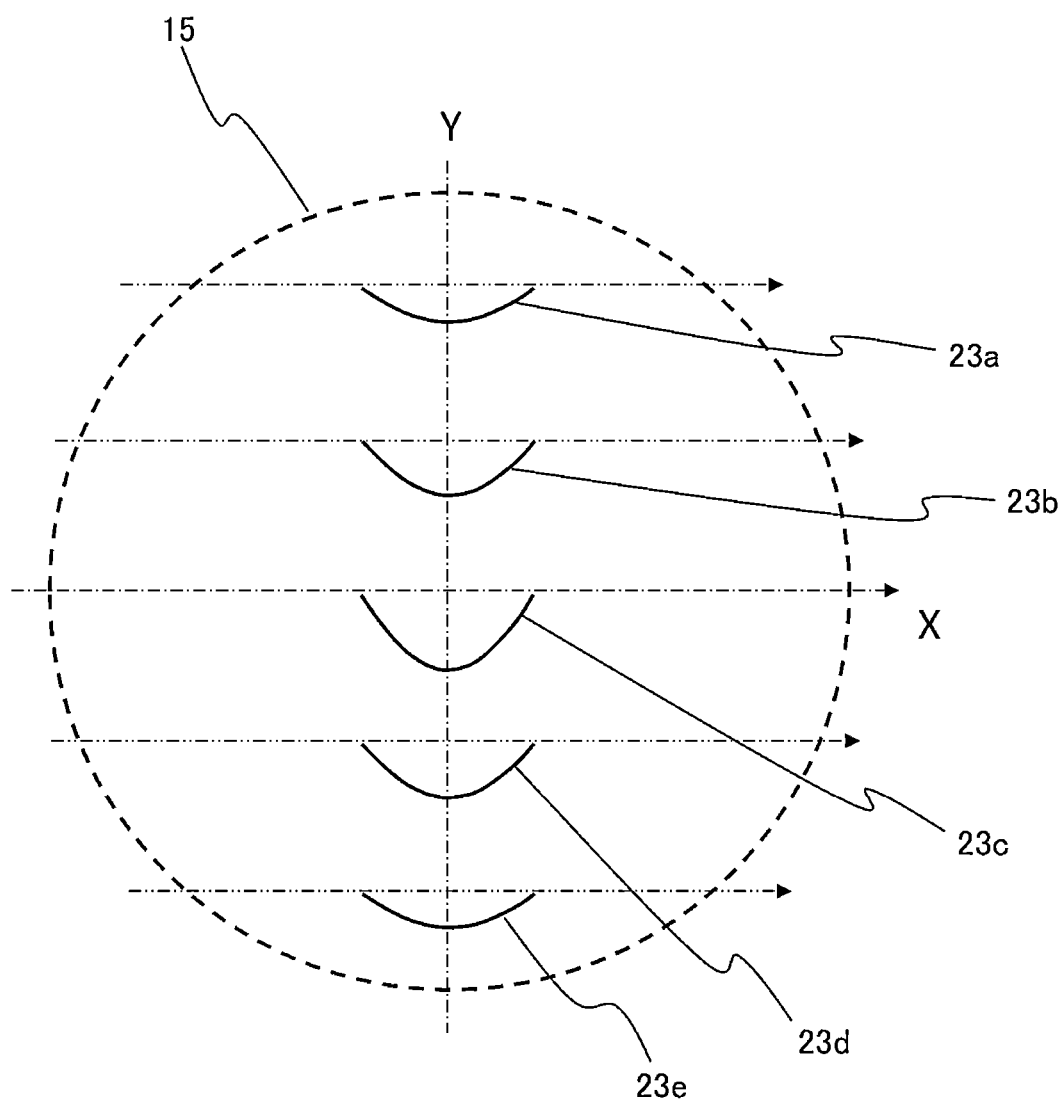
FIG. 7 is a diagram showing how a magnetic flux density distribution changes when a movable unit is scanned in an XY plane.

Next, a method for finding an ideal reference position $P_0$ will be described with reference to FIG. 7. FIG. 7 is a diagram showing how the magnetic flux density distribution changes when the movable unit is scanned in the XY plane. This process may be performed during calibration at the time of factory shipment or camera activation, and an OIS Hall signal value indicating the reference position $P_0$ may be stored.

First, the OIS actuator 4 scans the movable unit in the first direction. Here, it is assumed that the first direction coincides with the X-axis direction, and the scanning is performed in the X-axis direction. For example, with an electric current for driving in the Y-axis direction set to zero, an electric current for driving in the X-axis direction may be changed. At this time, it is unknown at which position on the extension line of the Y-axis of the AF position detection magnet 15 the magnetosensitive unit 16a of the AF Hall element 16 is located. As is shown in graphs 23a to 23e showing a change in the magnetic flux density, the magnitude of the change in the magnetic flux density varies in a manner that depends on the position of the magnetosensitive unit 16a, but a position at which the magnetic flux density reaches a peak is a position of X=0. That is, regardless of which Y-coordinate position is scanned, the position at which the magnetic flux density reaches a peak is X=0, and an OIS position detection signal value Hx at that time is an X coordinate of the reference position, so that a corresponding value $H_{0X}$ is stored. Subsequently, the same process is performed in the second direction. Here, the second direction coincides with the Y-axis direction, the movable unit is scanned in the Y-axis direction, a position at which the magnetic flux density reaches a peak is set as Y=0, and a value $H_{0Y}$ of an OIS position detection signal value Hy of the Y axis at that time is stored as the reference position. Note that the scanning order of the X axis and the Y axis may be reversed. In order to obtain the OIS position detection signal values $H_{0X}$, $H_{0Y}$ indicating the reference position $P_0$ as described above, a constant current is applied to the OIS actuator.

When the OIS position detection signal values $H_{0X}$, $H_{0Y}$ of the reference position $P_0$ are found as described above, the OIS position detection signal values $H_{0X}$, $H_{0Y}$ becomes an X-axis coordinate value and a Y-axis coordinate value, respectively. With a relationship between the displacement amount R (=$\Delta P$) from the reference position $P_0$ and a change in the magnetic flux density obtained in advance, correction is performed in accordance with the relational expression so as to prevent the detection result of the magnetic flux density, that is, the AF position detection signal value, from changing even when the position is displaced in the X-axis and Y-axis directions, so that the AF position detection signal changes only by displacement during AF, and crosstalk is corrected. The displacement amount from the reference position is calculated on the basis of the OIS position detection signals Hx, Hy as follows:

$$\Delta Hx = Hx - H_{0X}$$

$$\Delta Hy = Hy - H_{0Y},$$

and the displacement amount becomes two-dimensional values $\Delta X$, $\Delta Y$ of the X axis and the Y-axis, but the reference position is on the center line of the cylindrical magnet, so that the displacement amount can be converted into a radius as follows:

$$R=\sqrt{(\Delta X^2+\Delta Y^2)},$$

thereby allowing the displacement amount to be expressed by a one-dimensional value of R. In practice, it is not necessary to express the displacement amount as a distance, and all conversion may be performed on position detection values (or digital code values thereof) obtained via the Hall element.

$$R=\sqrt{(\Delta Hx^2+\Delta Hy^2)}$$

Figure 8:
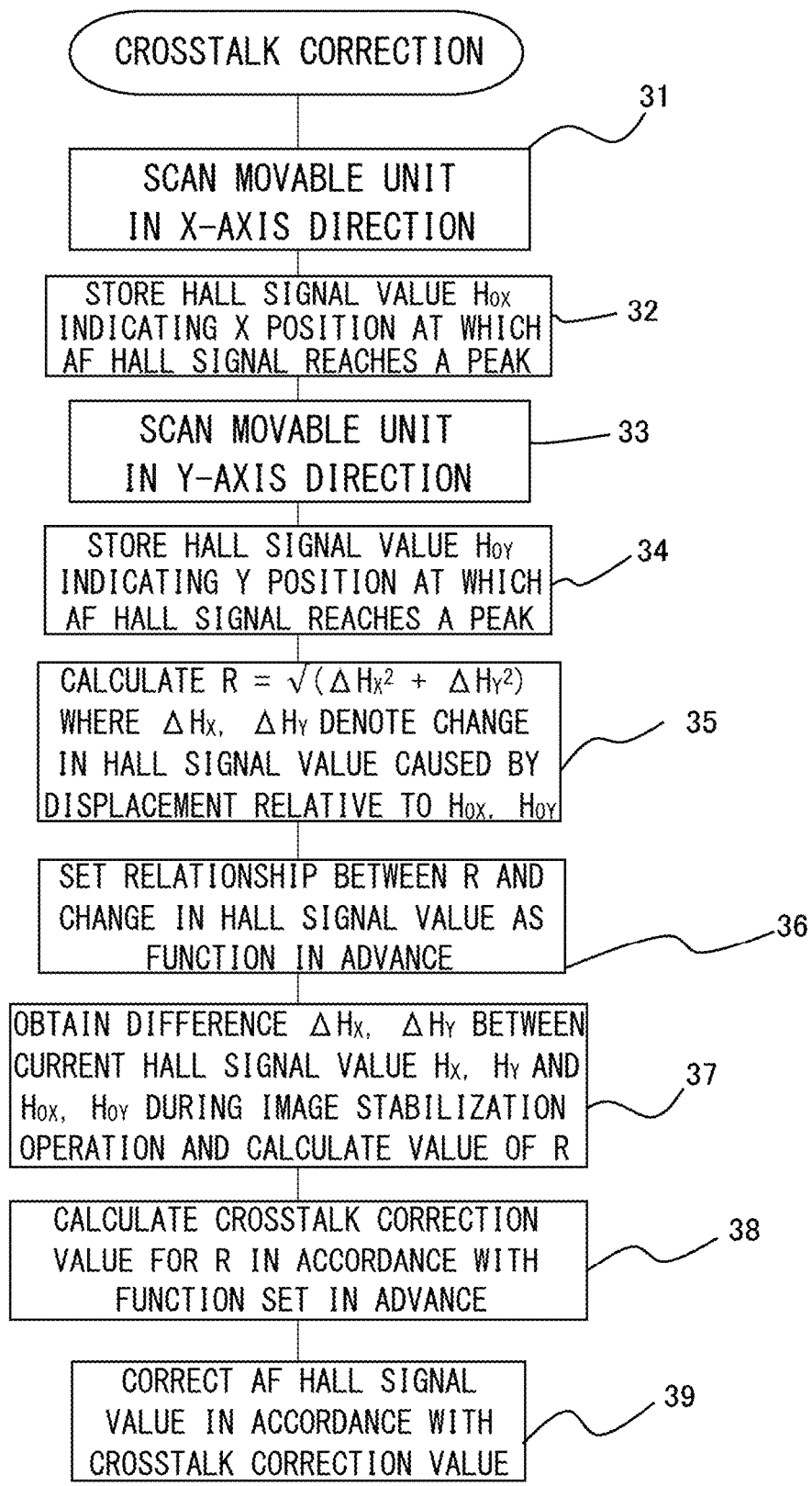
FIG. 8 is a flowchart showing a procedure of the crosstalk correction according to the embodiment.

Next, the overall flow of the crosstalk correction will be described with reference to a flowchart shown in FIG. 8. FIG. 8 is a flowchart showing a procedure of the crosstalk correction according to the embodiment. Note that processes 31 to 36 in the flowchart should be performed in advance during calibration at the time of factory shipment or camera activation, and processes 37 to 39 should be performed during autofocus operation or image stabilization operation.

First, as described above with reference to FIG. 7, the movable unit is scanned in the X-axis direction (process 31). At this time, a Hall signal $H_{0X}$ indicating the position in the X-direction at which the AF Hall signal reaches a peak is stored (process 32). Similarly, the movable unit is scanned in the Y-axis direction (process 33). At this time, a Hall signal $H_{0Y}$ indicating the position in the Y direction at which the AF Hall signal reaches a peak is stored (process 34). Accordingly, the coordinate values (Hall signal values $H_{0X}$, $H_{0Y}$) of the reference position $P_0$ are stored, so that a relationship between the displacement amount from the reference position $P_0$ and a change in the AF Hall signal value Sz is obtained next. With displacements from the reference position in the X direction and the Y direction each indicated by an OIS Hall signal and denoted by $\Delta H_X$, $\Delta H_Y$, respectively, the displacements are converted into a radius as follows:

$$R=\sqrt{(\Delta H_X^2+\Delta H_Y^2)} \quad \text{(process 35).}$$

Then, a relationship between R and a change in the AF Hall signal value Sz is converted into a function by measuring the relationship between both while changing R (process 36). Note that AF feedback control is not performed during the measurement of a change in the AF Hall signal. When the feedback control is performed, the AF movable unit is displaced in the optical axis direction so as to make the AF position detection signal constant, and the AF position detection signal does not change even when the OIS displacement occurs, so that the relational expression cannot be derived. When a change in the AF Hall signal is measured, no current may be applied to the AF actuator, or a constant current may be applied to the AF actuator.

In the process 36, when the magnetic flux density B is completely rotationally symmetric with respect to the reference position $P_0$, the relationship between R and the AF Hall signal value Sz may be measured by changing, with either of $\Delta H_X$, $\Delta H_Y$ fixed to zero, the other to change R.

Next, processing during actual AF and OIS operation will be described. The OIS movable unit is displaced by the image stabilization operation, and the OIS position detection signal changes accordingly. The displacement amounts $\Delta H_X$, $\Delta H_Y$ from the position detection signal of the reference position are obtained and converted into a radius, thereby calculating the change amounts $\Delta H_X$, $\Delta H_Y$ as R (process 37). Next, a correction value (crosstalk correction value) of the AF position detection signal for the R thus obtained is calculated in accordance with the function set in the process 36 (process 38). Finally, the AF Hall signal value is corrected in accordance with the crosstalk correction value (process 39). The above-described processes allows the crosstalk to the AF position detection signal caused by OIS displacement to be corrected.

Figure 9:
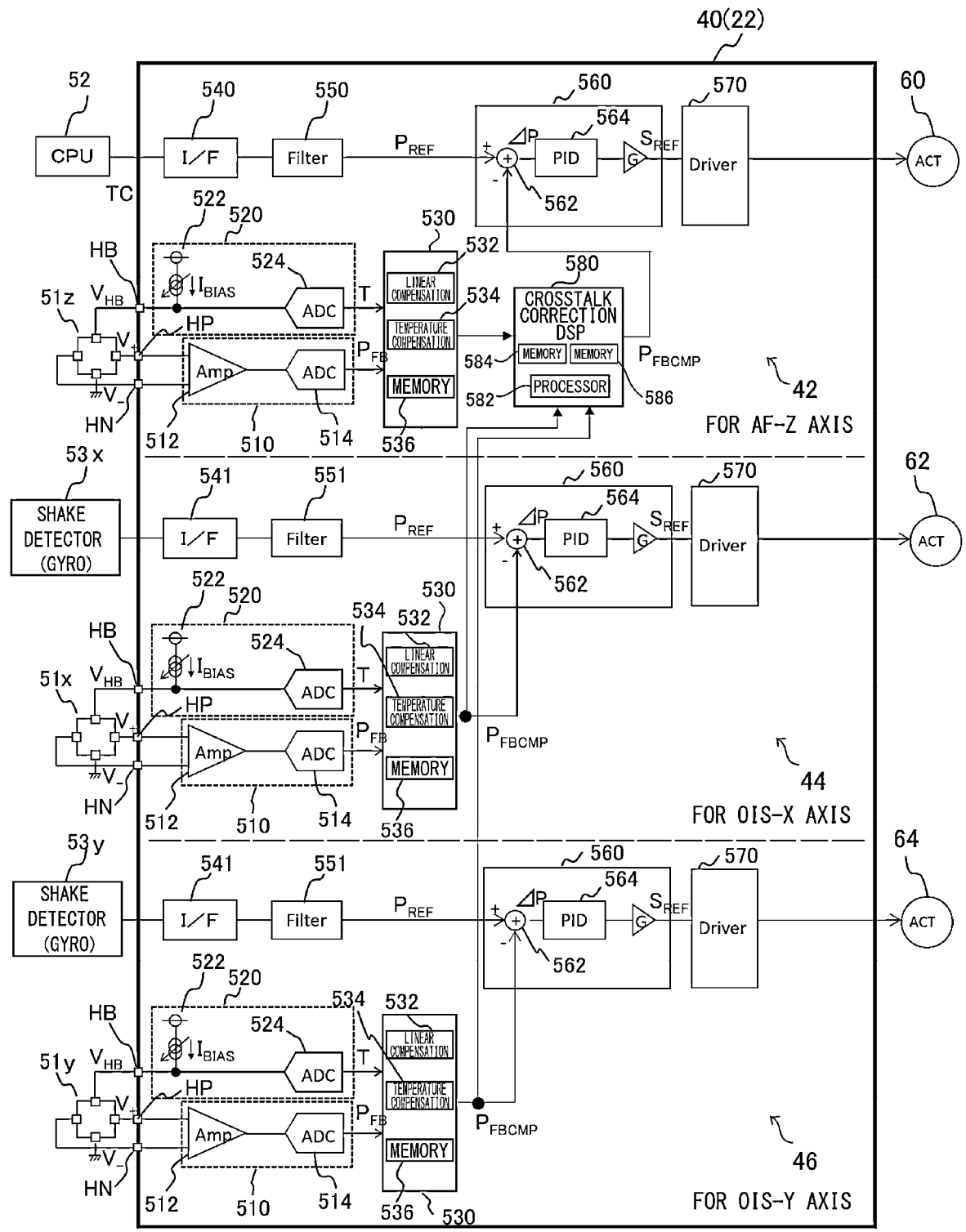
FIG. 9 is a block diagram showing an example of a structure of an actuator driver that performs the crosstalk correction according to the embodiment.

Next, an actuator driver having the above-described crosstalk correction function will be described. FIG. 9 is a block diagram showing an example of a structure of an actuator driver 40(22) that performs the crosstalk correction according to the embodiment. An actuator driver 40 is an IC obtained by integrating an AF (Z-axis) drive unit and OIS X-axis and Y-axis drive units 42, 44, 46.

The drive units 42, 44, 46 are capable of applying feedback control to corresponding actuators 60, 62, 64, respectively. The drive units 42, 44, 46 have the same structure.

Position detection elements 51x, 51y, 51z are Hall elements (corresponding to 14, 16 in FIG. 4) that each generate Hall voltages V+, V− on the basis of the displacement of the movable unit of a corresponding actuator, and supply the Hall voltages $V_+$, $V_-$ to Hall detection pins (HP, HN) of the actuator driver 40. Target information for control is supplied from the outside of the actuator driver. For AF, information on defocusing by the image sensor is detected on the basis of a contrast method, and is provided as the target information to the actuator driver by a CPU 52. For OIS, a signal is provided from a gyroscope 53 to the actuator driver as a camera shake signal. An angular velocity of camera shake is detected by the gyroscope 53, so that the angular velocity may be integrated in the actuator driver and converted into angle information.

A position detector 510 generates a digital position detection value $P_{FB}$ indicating the position (displacement) of the movable unit of the actuator on the basis of the Hall voltages $V_+$, $V_-$. The position detector 510 includes a Hall amplifier 512 that amplifies the Hall voltages and an A/D converter 514 that converts the output of the Hall amplifier 512 into the digital position detection value $P_{FB}$.

When a temperature needs to be corrected, a temperature detector 520 is used. The temperature detector 520 generates a temperature detection value T indicating a temperature. It is desirable that the temperature indicate the temperature of the position detection element 51, so that the Hall element that is the position detection element 51 is also used for temperature detection. This is because internal resistance r of the Hall element is temperature-dependent. The temperature detector 520 measures the internal resistance r of the Hall element and uses the internal resistance r as information indicating the temperature. The temperature detector 520 includes a constant current circuit 522 and an A/D converter 524. The constant current circuit 522 supplies a predetermined bias current $I_{BIAS}$ to the Hall element. The bias current $I_{BIAS}$ is also a power supply signal necessary for operating the Hall element, and thus the constant current circuit 522 can be regarded as a Hall bias circuit.

A voltage drop $I_{BIAS}*r$ occurs across both ends of the Hall element. This voltage drop is input to a Hall bias pin (HB). The A/D converter 524 converts a voltage $V_{HB}(=I_{BIAS}*r)$ of the HB pin into a digital value T. The bias current $I_{BIAS}$ is known and constant, so that the digital value T is a signal proportional to the internal resistance r and thus contains information on the temperature of the Hall element. A relationship between the internal resistance r and the temperature is measured, converted into a function or a table in advance, and the digital value T is converted into temperature information by a correction unit 530 in the subsequent stage.

An AF interface circuit 540 receives, from the CPU 52, a target code TC indicating the target position of the movable unit of the actuator. An OIS interface circuit 541 receives a pitch angular velocity $\omega_P$ and a yaw angular velocity $\omega_Y$ from the gyroscope that is a shake detector 53. For example, the interface circuits 540, 541 may be serial interfaces such as an inter IC ($I^2C$). An AF filter 550 filters the target code TC received by the interface circuit 540 to generate a position command value $P_{REF}$. When the position command value $P_{REF}$ abruptly changes, the position of the movable unit may be ringing. The ringing is reduced by the filter 550. An OIS filter 551 may be a gyro DSP. The gyro DSP 551 integrates the angular velocity signals $\omega_P$, $\omega_Y$ received by the interface circuit 541 to generate the position command value $P_{REF}$.

The correction unit 530 corrects the position detection value $P_{FB}$ received from the position detector 510. Specifically, the correction unit 530 includes a linear compensation unit 532, a temperature compensation unit 534, and a memory 536. The linear compensation unit 532 corrects linearity of a relationship between the position detection value $P_{FB}$ and the actual displacement. The memory 536 stores functions, various parameters, and the like used for correction. The memory 536 may be a nonvolatile memory such as a ROM or a flash memory, or may be a volatile memory that temporarily holds data supplied from an external ROM each time the circuit is activated.

The temperature compensation unit 534 corrects the relationship between the position detection value $P_{FB}$ and the actual displacement changed due to a temperature change.

A controller 560 receives the position command value $P_{REF}$ and a position detection value $P_{FB\_CMP}$ after the correction performed by the correction unit 530. Note that, for AF, the position detection value $P_{FB\_CMP}$ not only after the correction performed by the correction unit 530 but also after the crosstalk correction is received. The crosstalk correction will be described later. The controller 560 generates a control command value $S_{REF}$ so as to make the position detection value $P_{FB\_CMP}$ equal to the position command value $P_{REF}$. The controller 560 includes, for example, an error detector 562 and a PID controller 564. The error detector 562 generates a difference (error) $\Delta P$ between the position detection value $P_{FB\_CMP}$ and the position command value $P_{REF}$. The PID controller 564 generates the control command value $S_{REF}$ by proportional-integral-derivative (PID) operation. Instead of the PID controller 564, a PI controller may be used, or nonlinear control may be applied.

A driver 570 supplies a drive current corresponding to the control command value $S_{REF}$ to the actuator 60.

Next, the crosstalk correction will be described. A crosstalk correction DSP 580 is provided in the subsequent stage of the AF correction unit 530. The crosstalk correction DSP 580 includes a first memory 582, a second memory 584, and a processor 586.

The first memory 582 stores the OIS Hall signal value (output of the correction unit 530) as the position information on the reference position $P_0$. The second memory 584 stores the correction information indicating the relationship between the displacement amount $\Delta P$ (=R) from the reference position $P_0$ and the correction amount of the position detection signal for autofocus. The processor 586 calculates a correction amount of a position detection signal $P_{FB}'$ for autofocus in accordance with the displacement amount $\Delta P$ (=R) from the reference position $P_0$ during image stabilization operation, and subtracts the correction amount from the position detection signal for autofocus. In the memories 582, 584, information necessary for calibration at the time of factory shipment or camera activation is stored in advance.

During AF and OIS operation, the OIS X-axis and Y-axis position detection values corrected by the correction unit 530 are each branched to the crosstalk correction DSP 580. The processor 586 of the crosstalk correction DSP 580 calculates a difference between the current position detection value and the position detection value corresponding to the reference position $P_0$ stored in advance, converts the difference into a radius on the basis of difference information $\Delta X$, $\Delta Y$ of the X axis and the Y axis as follows:

$$R=\sqrt{(\Delta X^2+\Delta Y^2)},$$

calculates a crosstalk correction value for the current R from a relationship between R and a change in the AF position detection value stored in advance, corrects crosstalk of the AF position detection value, and outputs the position detection value $P_{FB\_CMP}$. As described above, the crosstalk to the AF position detection signal caused by OIS displacement is corrected.

Figure 10A:
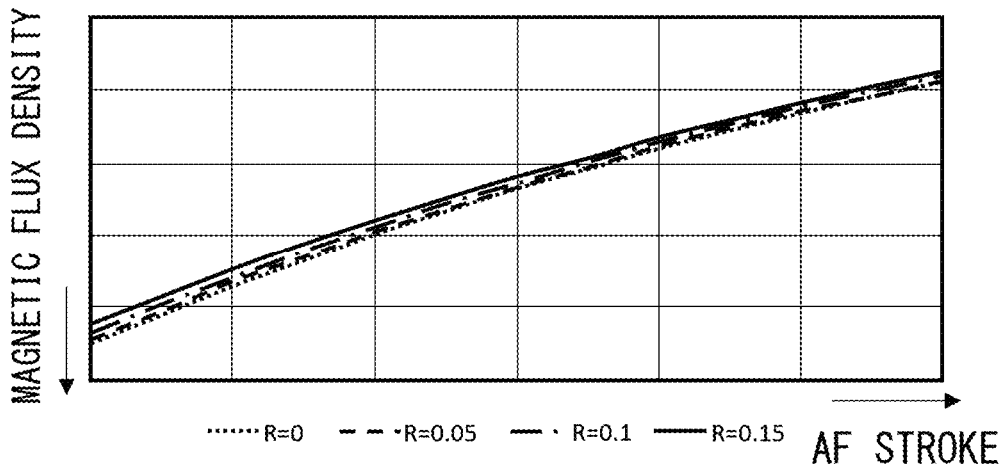
FIG. 10A to FIG. 10C are diagrams showing changes in a position detection signal when linear correction and the crosstalk correction are performed.

Next, an example of correction of an actual AF position detection signal will be described with reference to FIG. 10A to FIG. 10C. FIG. 10A shows a relationship between an AF stroke position and the position detection signal before correction. Although the vertical axis of the graph represents the magnetic flux density, a position detection signal proportional to the magnetic flux density is obtained, so that the magnetic flux density is equivalent to the position detection signal. As in FIG. 6, it is assumed that the N pole of the magnet faces downward, the coordinate axis of the magnetic flux density on the vertical axis of the graph is set downward. The larger the absolute value of the magnetic flux density, the smaller the magnetic flux density. The AF position detection signal changes in a manner that depends on the AF stroke position, and conversely, the AF stroke position can be determined from the AF position detection signal. The relationship between the AF stroke position and the AF position detection signal is not linear, but is curved slightly upward. Further, it is shown that the graph is entirely offset by the displacement amount from the reference position (converted into a radius denoted by R) and contains a crosstalk component.

In FIG. 10A, the amount of change in the position detection value proportional to the value of R changes in a manner that depends on the AF stroke position, and the difference due to R decreases toward the right side of the graph. Therefore, even when an offset correction value is given for each value of R in this state, an appropriate correction value varies in a manner that depends on the AF stroke position, so that correct crosstalk correction cannot be performed on the entire region of the stroke. Therefore, before the crosstalk correction, linear correction is first performed. FIG. 10B shows a result after the linear correction is performed on the result shown in FIG. 10A. How the linear correction is performed will be described later with reference to FIG. 11.

Figure 10B:
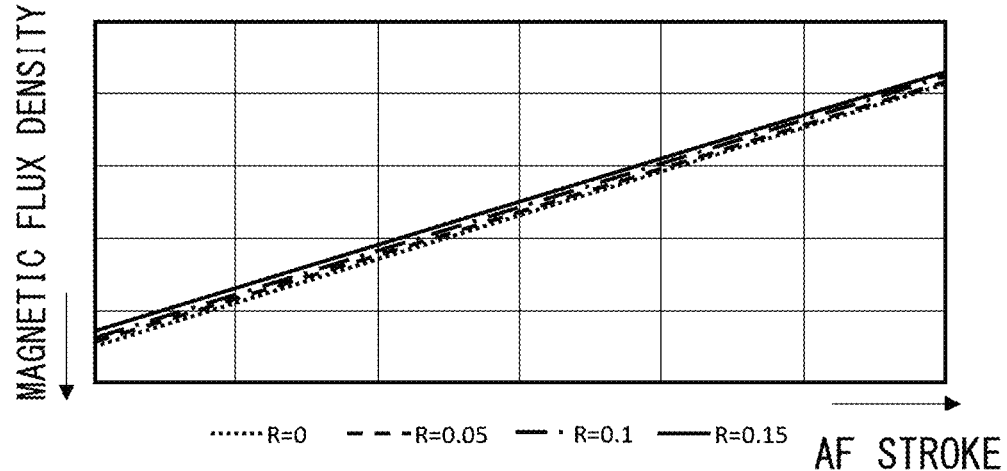
Figure 10C:
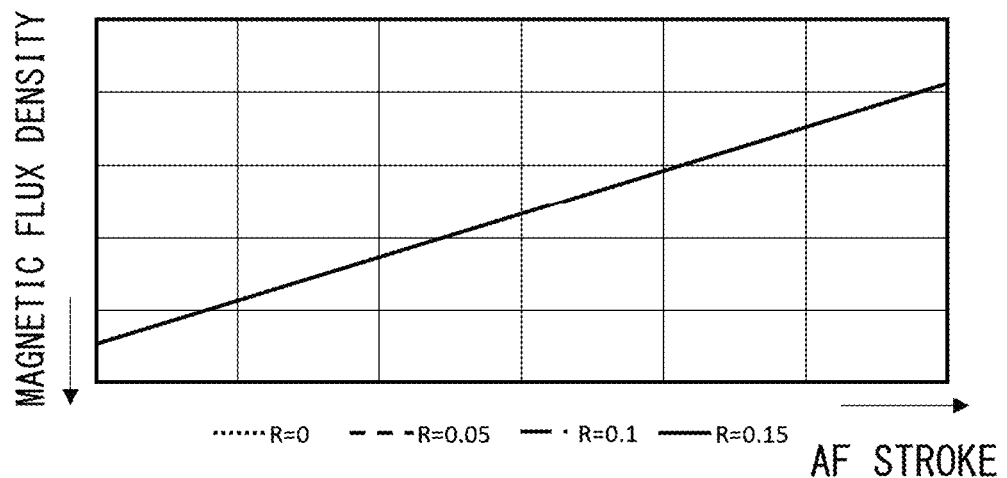

With reference to the result shown in FIG. 10B, the relationship between the AF stroke position and the AF position detection value for each value of R indicates a straight line, and the relationships are substantially parallel to each other. Therefore, when an offset for crosstalk correction is given for each value of R, results under a plurality of conditions are corrected to substantially one straight line as shown in FIG. 10C. That is, both the linear correction and the crosstalk correction are performed.

Figure 11:
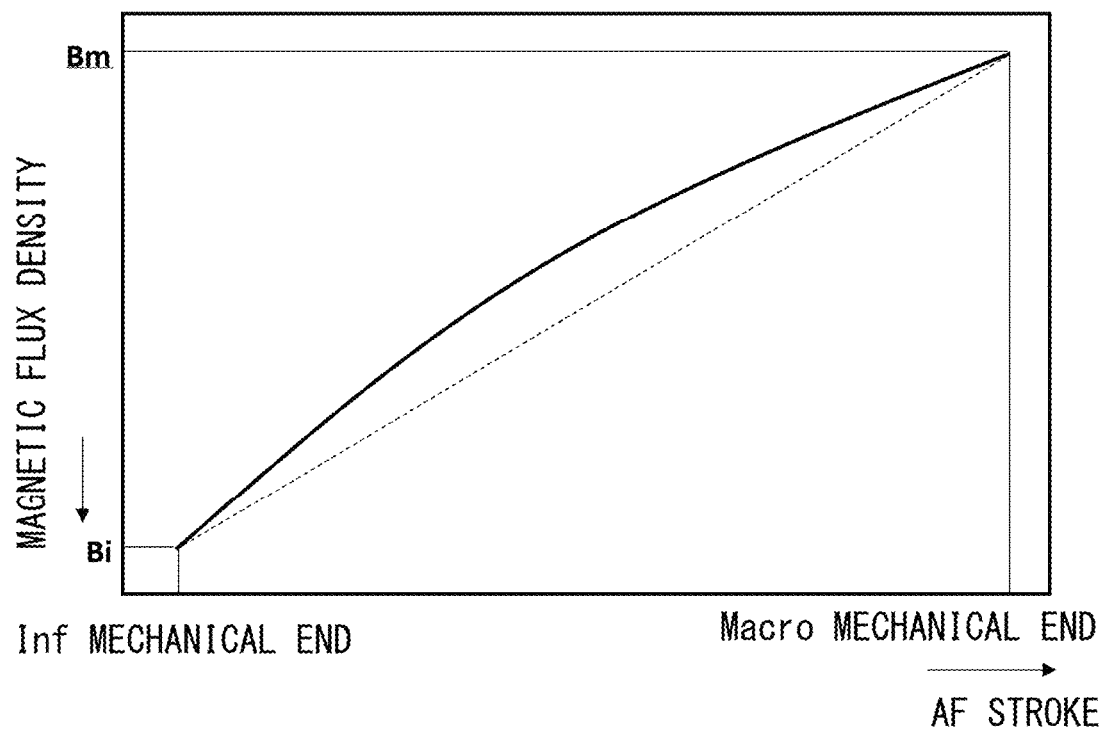
FIG. 11 is a diagram for describing a procedure of linear correction.

Next, a supplementary description will be given in brief of the linear correction with reference to FIG. 11. FIG. 11 is a diagram for describing a procedure of the linear correction. The horizontal axis of the graph represents the AF stroke, and a change in the magnetic flux density (AF position detection signal) from a mechanical end position adjacent to an infinity (Inf) side to a mechanical end position adjacent to a macro side is expressed by a solid line. The distance between the AF position detection magnet and the AF Hall element is the shortest at the Inf-side mechanical end, and thus the absolute value of the magnetic flux density indicates a maximum value Bi. The distance becomes the longest at the macro-side mechanical end, so that the absolute value of the magnetic flux density indicates a minimum value Bm. The solid line graph shows a quadratic curve because the graph is a function of the distance and is convex upward. Such a relationship is subjected to linear correction.

The linear correction is performed so as to cause a straight line after the linear correction to look like a straight line connecting both ends of the curve graph. The AF Hall signal for each AF stroke position is corrected so as to be a function of this straight line. The linear correction can be performed by fitting the solid line graph to a higher-order function, obtaining an inverse function of the function, applying the detected Hall signal to the inverse function to convert the Hall signal into stroke position information, and correcting the Hall signal to fit the Hall signal to a straight line estimated at the stroke position.

The camera module as described above is used in a mobile device such as a smartphone. In particular, one preferable application of the camera module according to the present disclosure is a camera module having both the optical image stabilization (OIS) function and the autofocus (AF) function, for each of which the position detector is provided, and it is effective to apply the camera module to a case where there is so-called crosstalk in which the AF position detection signal is affected by OIS operation. The use of the present disclosure makes it possible to provide a crosstalk correction method that allows an error in the position detection signal to be corrected in accordance with a radius by converting the displacement amount from the reference position into the radius even when the center of the position detection magnet and the position of the magnetosensitive unit of the Hall element are misaligned in the initial state (a state where image stabilization has yet to be performed, and no current is applied) due to assembly variations or the like, and an actuator driver having such a crosstalk correction function.

First Modification

In the embodiment, it is assumed that the magnetic flux density B is completely rotationally symmetric with respect to the reference position $P_0$, but in practice, the magnetic flux density B may be distributed like an ellipse. That is, in the process 35 shown in FIG. 8, an AF Hall signal value Sz when displaced from the reference position by a certain distance in the first direction (u-axis direction) may be different from an AF Hall signal value Sz when displaced from the reference position by the same distance in the second direction (y-axis direction). In this case, two constants $A_U$, $A_V$ are introduced and converted into a radius on the basis of $R'=\sqrt{(A_U \Delta U^2 + A_V \Delta V^2)}$, and a relationship between R' and the AF Hall signal value Sz may be held as correction information.

The first direction and the second direction may be the minor-axis direction and the major-axis direction (or vice versa) of the ellipse, respectively. When the X-axis direction corresponds to the minor axis, and the Y-axis direction corresponds to the major axis, the radius conversion may be performed by $R'=\sqrt{(A_X \Delta H_X^2 + A_Y \Delta H_Y^2)}$. During actual operation, the displacement amount R' may be calculated on the basis of $R'=\sqrt{(A_X \Delta H_X^2 + A_Y \Delta H_Y^2)}$, and the AF Hall signal value Sz may be corrected on the basis of the correction amount corresponding to the displacement amount R'.

Second Modification

In the process 36 shown in FIG. 8, the relationship between the radius R obtained by the conversion and the correction amount based on the AF Hall signal value Sz is converted into a function and stored, but the process 36 is not limited to such a process. For example, the relationship between the radius R obtained by the conversion and the correction amount may be held in a table, and the correction value corresponding to the radius R obtained by the conversion may be acquired by referring to the table in the process 38. When the table holds the values of all radii R obtained by the conversion, a memory capacity increases. Therefore, a relationship between a plurality of discrete radii $R_0$, $R_1$, $R_2$, ..., $R_n$ obtained by the conversion and correction values $C_0$, $C_1$, $C_2$, ..., $C_n$ may be held in a table, and a correction value C for an intermediate value R may be calculated by linear interpolation.

While the preferred embodiments of the present disclosure have been described using specific terms, such description is for illustrative purposes only, and it is to be understood that changes and variations may be made without departing from the spirit or scope of the appended claims.

What is claimed is:

1. A correction method applied to a camera module, the camera module including a movable unit including an imaging lens and a magnet, an autofocus position detector including a magnetic field detection element structured to detect magnetic field generated by the magnet, the autofocus position detector being structured to generate a position detection signal indicating a position of the movable unit in a Z-axis direction, an autofocus actuator structured to position the movable unit in the Z-axis direction along an optical axis, and an image stabilization actuator structured to position the movable unit in an X-axis direction and a Y-axis direction orthogonal to each other in a plane orthogonal to an optical axis direction of the imaging lens, the correction method comprising:
   displacing the movable unit in a first direction using the image stabilization actuator and detecting a position in the first direction when the position detection signal reaches a peak value;
   displacing the movable unit in a second direction using the image stabilization actuator and detecting a position in the second direction when the position detection signal reaches a peak value;
   storing a reference position based on the position in the first direction and the position in the second direction;
   storing correction information indicating a relationship between a displacement amount, from the reference position, of the movable unit displaced by the image stabilization actuator and a correction amount of the position detection signal;
   acquiring, during image stabilization and autofocus operation, the displacement amount of the movable unit from the reference position on the basis of the correction information and generating the correction amount corresponding to the displacement amount; and
   correcting the position detection signal using the correction amount.

2. The correction method according to claim 1, wherein when displacement amounts from the reference position in the first direction and the second direction are denoted by ΔU, ΔV, respectively, the correction information indicates a relationship between a radius R of $R=\sqrt{(\Delta U^2+\Delta V^2)}$ and the correction amount.

3. The correction method according to claim 1, wherein when displacement amounts from the reference position in the first direction and the second direction are denoted by ΔU, ΔV, respectively, and $A_U$, $A_V$ each denote a constant, the correction information indicates a relationship between a radius R of $R=\sqrt{(A_U\Delta U^2+A_V\Delta V^2)}$ and the correction amount.

4. The correction method according to claim 1, wherein feedback control for autofocus is not performed in the displacing the movable unit in the first direction and the displacing the movable unit in the second direction.

5. The correction method according to claim 1, further comprising performing linear correction on the position detection signal before the correcting.

6. An actuator driver used in a camera module, the camera module including a movable unit including an imaging lens and a magnet, an autofocus actuator structured to position the movable unit in a Z-axis direction along an optical axis, an autofocus position detector including a magnetic field detection element structured to detect magnetic field generated by the magnet, the autofocus position detector being structured to generate a position detection signal indicating a position of the movable unit in the Z-axis direction, and an image stabilization actuator structured to position the movable unit in an X-axis direction and a Y-axis direction orthogonal to each other in a plane orthogonal to an optical axis direction of the imaging lens, the actuator driver comprising:

an autofocus drive unit structured to control the autofocus actuator;

an image stabilization drive unit structured to control the image stabilization actuator;

a first memory storing a reference position;

a second memory storing correction information;

and a processor, wherein in a calibration process, the movable unit is displaced in a first direction, and a position in the first direction when the position detection signal reaches a peak value is detected, in the calibration process, the movable unit is displaced in a second direction, and a position in the second direction when the position detection signal reaches a peak value is detected, in the calibration process, a reference position based on the position in the first direction and the position in the second direction is stored in the first memory, and in the calibration process, correction information indicating a relationship between a displacement amount, from the reference position, of the movable unit displaced by the image stabilization actuator and a correction amount of the position detection signal is stored in the second memory, wherein the processor generates, during image stabilization and autofocus operation, the correction amount corresponding to the displacement amount of the movable unit from the reference position on the basis of the correction information and corrects the position detection signal using the correction amount.

* * * * *